US008364909B2

(12) United States Patent
Chakrabarti (10) Patent No.: US 8,364,909 B2
(45) Date of Patent: Jan. 29, 2013

(54) DETERMINING A CONFLICT IN ACCESSING SHARED RESOURCES USING A REDUCED NUMBER OF CYCLES

(75) Inventor: Dhruva Chakrabarti, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 589 days.

(21) Appl. No.: 12/692,792

(22) Filed: Jan. 25, 2010

(65) Prior Publication Data

US 2011/0185359 A1   Jul. 28, 2011

(51) Int. Cl.
*G06F 13/00* (2006.01)
(52) U.S. Cl. .................. 711/150; 711/E12.023
(58) Field of Classification Search .................. None
See application file for complete search history.

(56) References Cited

U.S. PATENT DOCUMENTS

| 2008/0288819 A1* | 11/2008 | Heller, Jr. ................ 714/19 |
| 2009/0113443 A1* | 4/2009 | Heller Jr. et al. ......... 718/106 |
| 2011/0119452 A1* | 5/2011 | Heller, Jr. ............... 711/147 |

* cited by examiner

*Primary Examiner* — Edward Dudek, Jr.
*Assistant Examiner* — Sean D Rossiter (57) ABSTRACT

Illustrated is a system and method for identifying a potential conflict, using a conflict determination engine, between a first transaction and a second transaction stored in a conflict hash map, the potential conflict based upon a potential accessing of a shared resource common to both the first transaction and the second transaction. The system and method further includes determining an actual conflict, using the conflict determination engine to access the combination of the conflict hash map and the read set hash map, between the first transaction and the second transaction, where a time stamp value of only selected shared locations has changed relative to a previous time stamp value, the time stamp value stored in the read set hash map and accessed using the first transaction.

20 Claims, 9 Drawing Sheets

DETERMINING A CONFLICT IN ACCESSING SHARED RESOURCES USING A REDUCED NUMBER OF CYCLES

BACKGROUND

Concurrency control of software applications executing in parallel can be facilitated through the use of semaphores, locks, Software Transactional Memory (STM), or other mechanism used to enforce policies regarding the use of system resources. System resources include memory, Central Processing Unit (CPU) cycle management, or other resources that must be managed where a plurality of software applications need access to a system. Common to semaphores and locks is a pessimistic approach, whereby a software application must possess a semaphore, lock, or similar mechanism before being allowed access to shared resources. In contrast, common to STM is an optimistic approach, whereby software applications are given access to shared resources, and only after access is granted does a validation process occur. The validation process under STM can result in a commit occurring, where the software application is allowed access to the shared resources, or an abort occurring where the software application is denied access to system resources. In cases where an abort occurs, the system resources may be rolled back to a previous state (e.g., a memory value may be restored to a state before the software application being validated was executed).

BRIEF DESCRIPTION OF THE DRAWINGS

Some embodiments of the invention are described, by way of example, with respect to the following figures.

DETAILED DESCRIPTION

Illustrated is a system and method for implementing a STM through the use of a static conflict analysis between atomic sections of software code. As shown below, multiple counters are used to validate a transaction that uses a shared resource. A transaction, as used herein, is the use by a software application of a shared resource. Specifically, the software application may access this shared resource through the use of a function, a variable, a class object, or a structure. Transactions may be distinguished in terms of transaction granularity. Examples of transaction granularity include variable level granularity, thread level granularity, function level granularity, or some other suitable granularity.

In some example embodiments, a software application is validated based upon some level of transaction granularity. For example, a counter (i.e., a counter) is mapped to a set of shared memory locations represented as one or more variables. A variable, as referenced herein, represents a memory address. This mapping is an example of variable level granularity. The counter value is changed where the memory location represented by the variable is updated. Through a comparison of the counter value to an initial counter value or a previous counter value, a STM commit or abort operation is executed. As is more fully illustrated below, this comparison includes the use of a conflict hash map generated from a static conflict map, and a read set hash map generated during run time.

In some example embodiments, a static conflict map is generated at compile time. A static conflict graph is a mapping between transactions, at some level of transactional granularity, to a set of counters. For example, given a software application "A1" that includes variables X, Y, and Z, and software application "A2" that includes the same variables, a static conflict graph is generated that has a node corresponding to each of A1 and A2 and an edge between the two nodes annotated with X, Y, and Z. The edges and the corresponding annotation indicates that A1 and A2 conflict in the variables X, Y, and Z. The static conflict map may be implemented through the use of the following example software pseudo-code:

```
atomic A1 // "atomic" is a keyword denoting a transactional load in the
       // form of a function (e.g., "A1") that has a scope inside which
       // all memory accesses appear to be executed atomically.
{
= X // entity as a variable
AddMap(C1, X) // function call to validate the transaction "X" using the
       // global counter "C1," where "X" is a variable in memory
       // and "C1" is an integer data type.
= Y // entity as a variable.
= Z // entity as a variable.
}
atomic A2
{
= X
AddMap(C1, X)
= Y
}
```

In some example embodiments, the static conflict graph is generated through a compiler walking the statements of the above software code, examining every transactional load, identifying the counter (e.g., "C1") that covers the location (e.g., "X") referenced in the transactional load, and adding a mapping from the counter to the shared memory location.

In some example embodiments, at runtime the software code is validated through a combination of conflict hash map and read set hash table entries. At run time, a conflict hash map is generated from the static conflict graph. This conflict hash map maps a counter to the set of shared locations it covers. The read set hash map maintains a mapping from a shared location to a timestamp associated with it. The read set hash map is built up as the atomic section is executed at runtime. At any point in execution, the read set tracks the set of transactions (e.g., memory locations) that have been read since the start of the atomic section. The time at which a location is read is recorded as a timestamp. The read set hash map maintains this correspondence between a read location and its timestamp as a mapping. By using the conflict hash map and the read set hash map together the number of CPU cycles used to implement an STM regime is reduced for only those transactions in the set of transactions that have been read since the start of the atomic section are access to determine whether an actual conflict in the accessing of memory exists between transactions.

Where the software code is sought to be validated through the use of STM, a connection is made between the conflict hash map entries (i.e., the counters) and read set hash table entries (i.e., those entries reflecting a potential conflict). For every changed counter, the conflict hash map is queried and the corresponding list of shared locations is obtained. The read set hash map is queried with these shared locations and only those entries in the read set hash map are validated for the purpose of determining an STM commit or abort. This technique selectively indexes into the read set hash map. Thus, the number of entries verified can be lower than the read set size.

Figure 1:
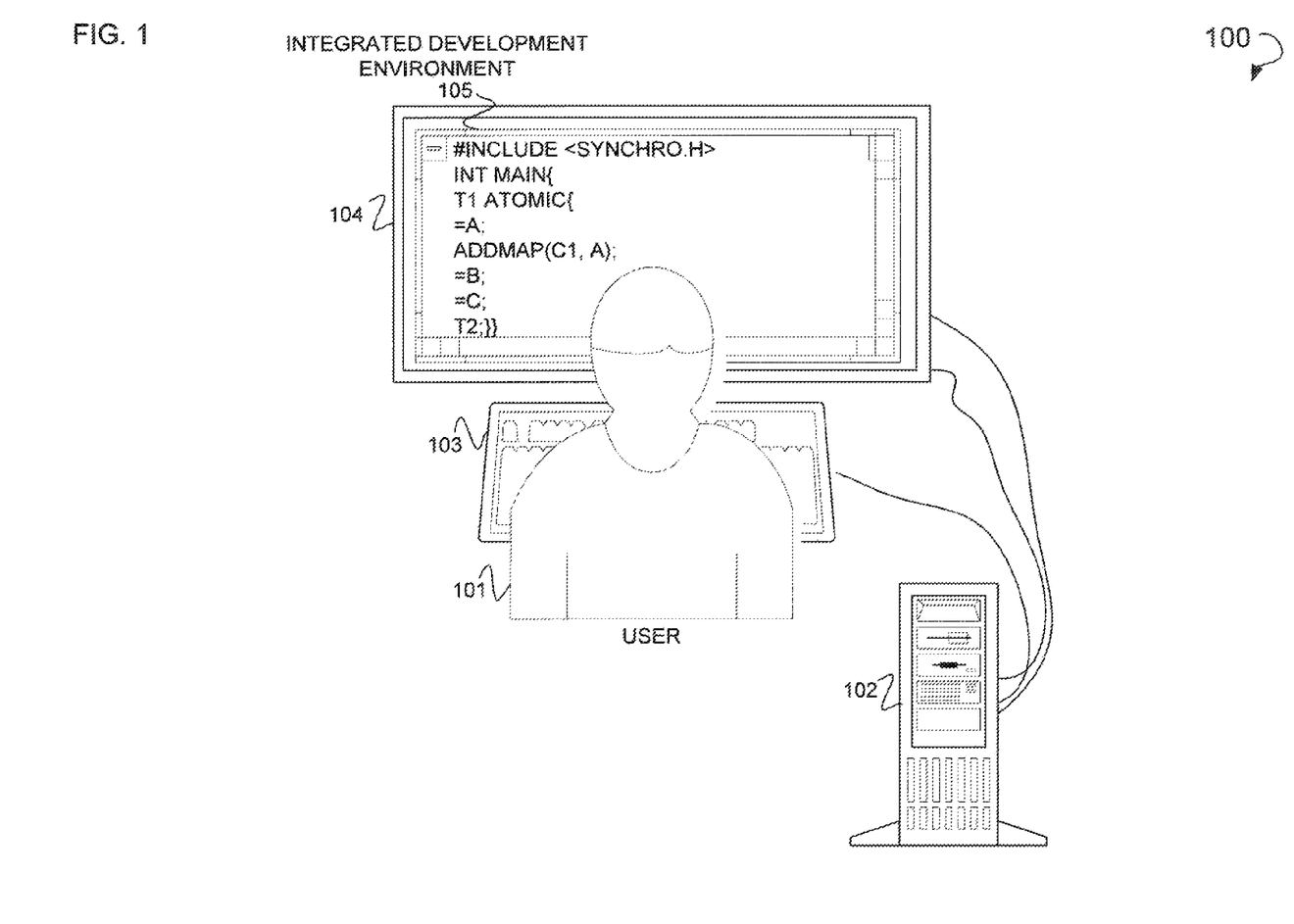
FIG. 1 is a diagram of a system, according to an example embodiment, illustrating a context for implementing the system and method illustrated herein.

FIG. 1 is a diagram of an example system 100 illustrating a context for implementing the system and method illustrated herein. Shown is a user 101 who uses a computer 102 to implement the system and method illustrated herein. Operatively coupled to the computer 102 are an input device 103 in the form of a keyboard, and an output device 104 in the form of a monitor. Using the input device 103, the user 101 generates software code such as is reflected visually on the output device 104. This code is compiled or interpreted using a compiler or interpreter that is part of an Integrated Development Environment (IDE) 105. The IDE 105 resides on the computer system 102. The software code is converted by the compiler or interpreter into instructions that have a machine readable format. These instructions can be executed by the computer 102, or other suitable computer, to implement STM through the use of a static conflict analysis between atomic sections of software code.

Figure 2:
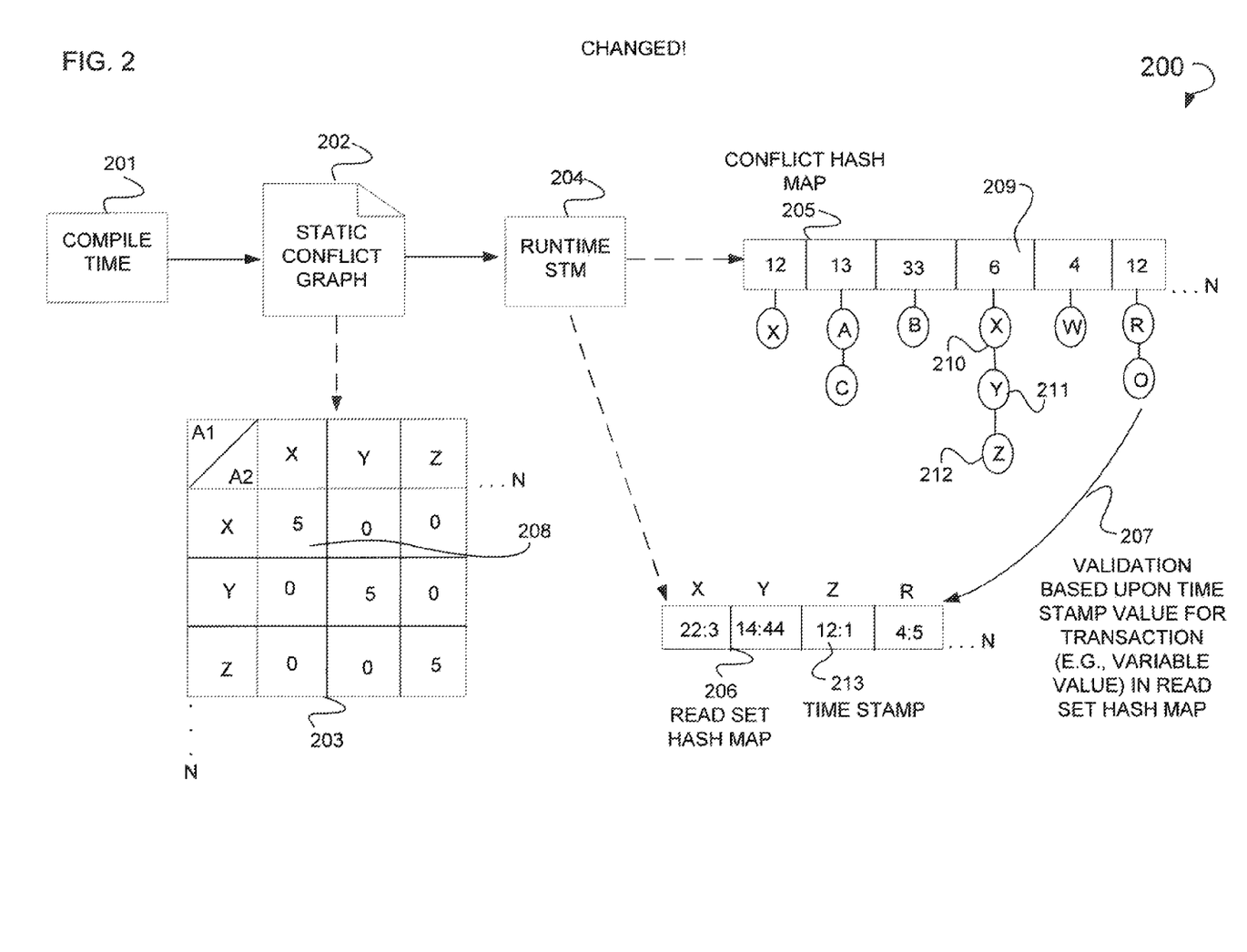
FIG. 2 is a diagram of a system, according to an example embodiment, for performing STM through the use of a static conflict analysis between atomic sections of software code.

FIG. 2 is a diagram of an example system 200 for implementing STM through the use of a static conflict analysis between atomic sections of software code. Each of these atomic sections uses one or more counters. Shown is a compile time block 201, wherein software code is compiled to generate a static conflict graph 202. This compile time block 201 is implemented as part of the IDE 105. An example of a static conflict graph 202 is a matrix 203. Matrix 203 reflects function level transactional granularity, and the variables associated with each of the functions "A1" and "A2." These variables include "X," "Y," and "Z." Also illustrated is a matrix entry 208 reflecting a potential conflict between the accessing of the variable "X" by the functions "A1" and "A2." This conflict is illustrated where the matrix entry 208 is set to "5." As is more fully illustrated below, this conflict may be represented as an edge (i.e., a conflict edge) in a graph, where the nodes of the graph represent the transactions that result in the accessing of shared memory represented by a variable counter Further shown, is a runtime STM block 204. This runtime STM block 204 may be implemented as part of the IDE 105, or by another computer system as part of a concurrency control regime. When the runtime STM block 204 is executed, a conflict hash map 205, and a read set hash map 206 are generated. As illustrated, the conflict hash map 205 is populated with memory locations (e.g., 210-212) in the form of shared variables. The conflict hash map 205 and read set hash map 206 may use bucket hashing, cluster hashing, or may use some other suitable data structure. The conflict hash map 205 is queried using a counter value taken from the static conflict graph 202 where the counter value maps to the memory locations. In some example embodiments, some other level of transactional granularity is implemented such as thread level granularity, function level granularity, or some other suitable granularity. After initialization to some predetermined value (e.g., "0"), each counter value is incremented each time the variable to which the counter corresponds is updated. Also shown is the read set hash map 206 that includes a timestamp (e.g., 213) for each shared location that is engaged in during the course of the execution of a software application. The read set hash map is queried using the address of a shared location. As illustrated at 207, where a transaction in the form of a function is sought to be validated as part of an STM regime, the read set hash map 206 is accessed and the timestamp included therein analyzed to determine if the shared resource has been updated by another transaction. Here, for example, as is illustrated at 209, where a change to a counter value has occurred, the counter value is used to query the conflict hash map to identify shared locations (e.g., 210-212) that could have been updated during the execution of a software application. These shared locations are used to query the read set hash map 206. For example, through the use of "Z" denoted at 212, the time stamp for "Z" is retrieved as denoted at 213. This time stamp may be used to determine whether an STM abort or commit can be executed.

Figure 3:
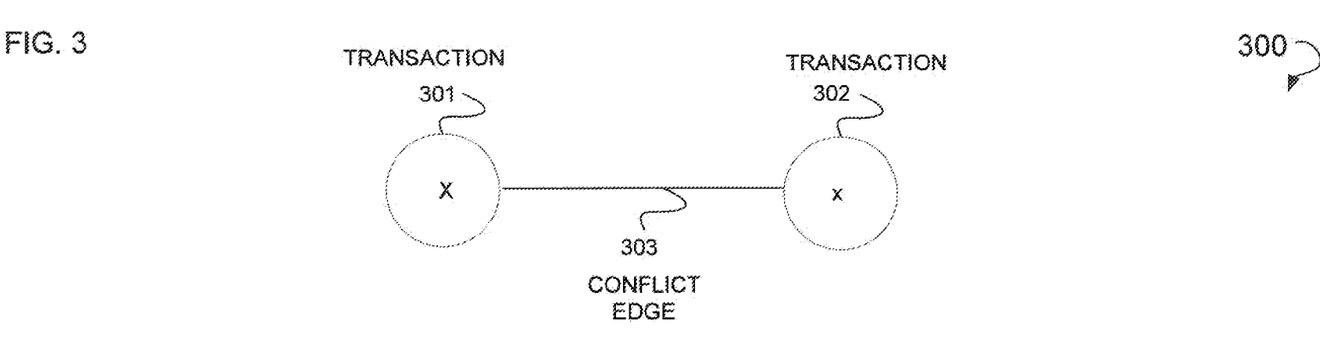
FIG. 3 is a graph, according to an example embodiment, illustrating a trivial conflict graph.

FIG. 3 is an example graph 300 illustrating a trivial conflict graph. Shown is a transaction node 301 representing "A1," and a variable (e.g., "X") associated with the execution of "A1." Also shown is a transaction node 302 representing "A2," and the variable (e.g., "X") associated with the execution of "A2." A conflict edge 303 connects transaction nodes 301 and 302 illustrating a potential conflict between these two functions accessing of "X" during run time. The determination of an actual conflict is made through a comparison of the entries in the read set hash map 206 and the conflict hash map 205 and the entries associated therewith.

Figure 4:
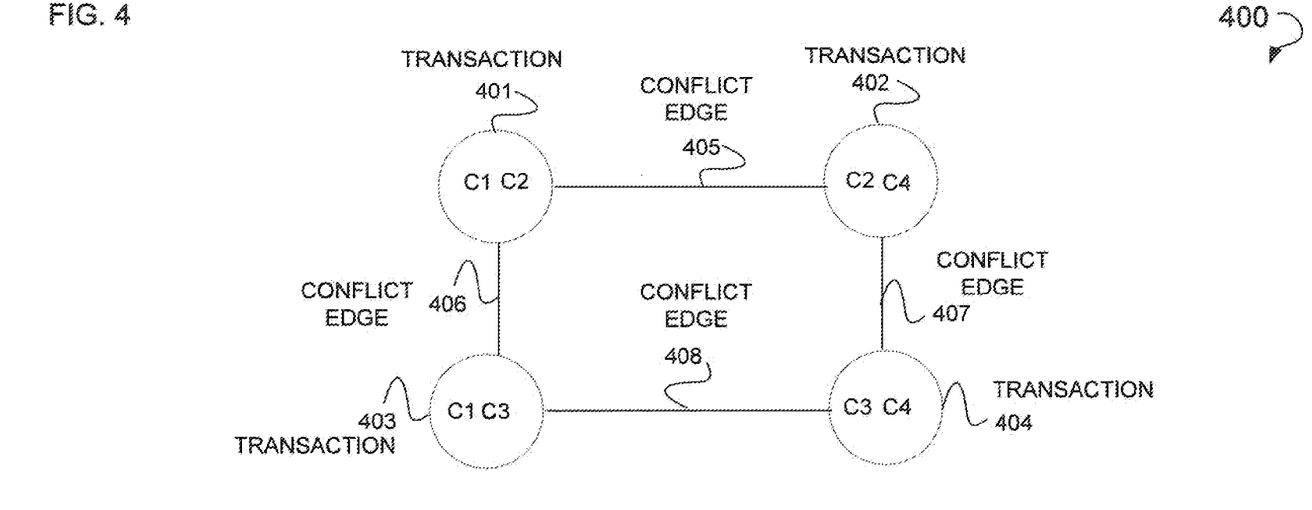
FIG. 4 is a graph, according to an example embodiment, illustrating a complex conflict graph.

FIG. 4 is an example graph 400 illustrating a complex conflict graph. Shown are transaction nodes 401-404. Associated with these transaction nodes 401-404 are four counters represented as C1-C4. Each of these counters maps to a shared location. Also shown are conflict edges 405-408 illustrating potential conflicts between transactions associated with the nodes 401-404. Specifically, conflict edge 405 reflects a potential conflict between transactions 401 and 402. Conflict edge 406 reflects a potential conflict between transactions 401 and 403. Conflict edge 408 reflects potential conflicts between transactions 403 and 404. Conflict edge 407 reflects potential conflicts between transactions 404 and 402. The determination of an actual conflict is made through a comparison of the entries in the read set hash map 206 and the conflict hash map 205 and the entries associated therewith.

Figure 5:
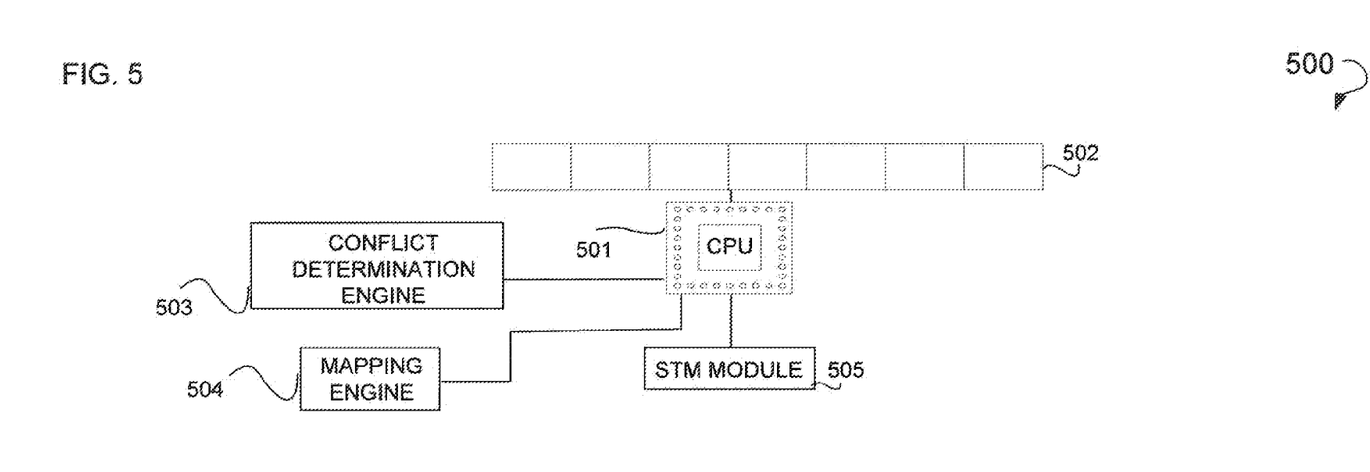
FIG. 5 is a block diagram of a computer system, according to an example embodiment, used to perform STM through the use of a static conflict analysis between atomic sections of software code.

FIG. 5 is a block diagram of an example computer system in the form of the computer 102 used to perform STM through the use of a static conflict analysis between atomic sections of software code. These various blocks may be implemented in hardware, firmware, or software as part of the computer 102. Further, these various blocks are logically or physically connected. Shown is a CPU 501 operatively connected to a memory 502. Operatively connected, as used herein, includes a logical or physical connection. Operatively connected to the CPU 501 is a conflict determination engine 503 to identify a potential conflict between a first transaction and a second transaction both stored in a read set hash map and a conflict hash map, the potential conflict based upon a potential accessing of a shared resource common to both the first transaction and the second transaction. Further, the conflict determination engine 503 is executed to determine an actual conflict access the combination of the between the first transaction and the second transaction, where a time stamp value of only selected shared locations has changed relative to a previous time stamp value, the time stamp value stored in the read set hash map and accessed using the first transaction. In some example embodiments, the conflict determination engine 503 access the combination of the conflict hash map and the read set hash map. In some example embodiments, the conflict hash map is instantiated at runtime from a static conflict graph, the static conflict graph including the first transaction and the second transaction as nodes in the static conflict graph, and the potential conflict as an edge in the static conflict graph. Operatively connected to the CPU 501 is a mapping engine 504 to map a counter value to corresponding shared locations, the counter value having been obtained from the static conflict graph. In some example embodiments, the first and second transactions include at least one of a variable, a thread, or a function. Additionally, the shared resource includes memory. In some example embodiments, the conflict determination engine 503 is used to identify the potential conflict through a change in a counter value relative to a previous counter value, the counter used to access an address of a potentially conflicting shared resource as stored in the conflict hash map, this address used to query the read set hash map and validate only entries found in the read set hash map. Operatively connected to the CPU 501 is a STM module 505 to abort the first transaction based upon the actual conflict.

Figure 6:
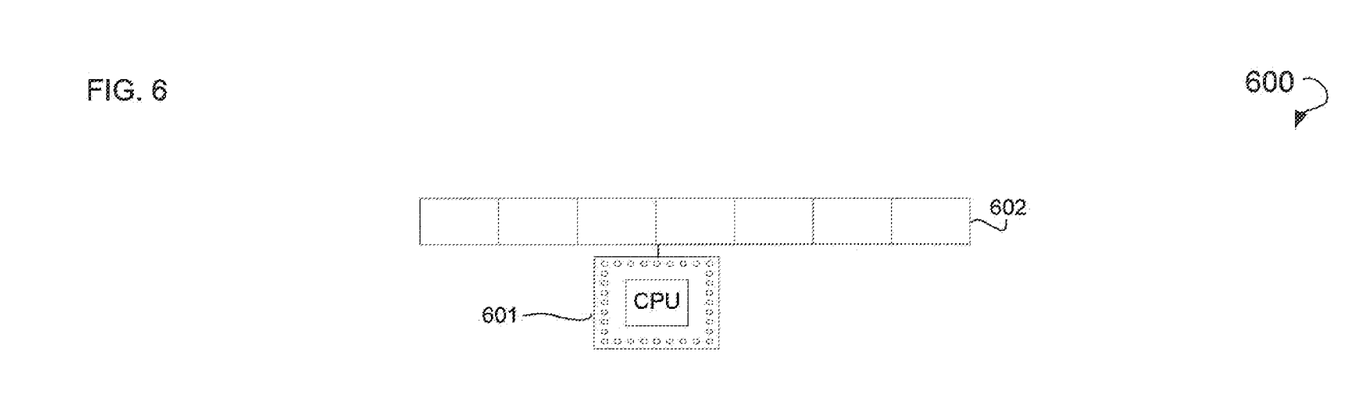
FIG. 6 is a block diagram of a computer system, according to an example embodiment, used to perform STM through the use of a static conflict analysis between atomic sections of software code.

FIG. 6 is a block diagram of an example computer system in the form of the computer 102 used to perform STM through the use of a static conflict analysis between atomic sections of software code. These various blocks may be implemented in hardware, firmware, or software as part of the computer 102. Further, these various blocks are logically or physically connected. Shown is a CPU 601 operatively connected to a memory 602. In some example embodiments, the memory 602 in communication with at least one processor in the form of the CPU 601, the memory 602 including logic encoded in one or more tangible media for execution and when executed by the CPU 601 operable identify a potential conflict between a first transaction and a second transaction both stored in a read set hash map and a conflict hash map, the potential conflict based upon a potential accessing of a shared resource common to both the first transaction and the second transaction. The logic encoded on the memory 602 may also be executed to determine an actual conflict, through the access of the conflict hash map and the read set hash, between the first transaction and the second transaction, where a time stamp value of only selected shared locations has changed relative to a previous time stamp value, the time stamp value stored in the read set hash map and accessed using the first transaction. In some example embodiments, the conflict hash map is instantiated at runtime from a static conflict graph, the static conflict graph including the first transaction and the second transaction as nodes in the static conflict graph, and the potential conflict as an edge in the static conflict graph. The logic encoded on the memory 602 may also be executed to map a counter value to corresponding shared locations, the counter value having been obtained from the static conflict graph. In some example embodiments, the first transaction and the second transaction include at least one of a variable, a thread, or a function. In some example embodiments, the system resource includes memory. The logic encoded on the memory 602 may also be executed to identify the potential conflict through a change in a counter value relative to a previous counter value, the counter used to access an address of a potentially conflicting shared resource as stored in the conflict hash map, this address used to query the read set hash map and validate only entries found in the read set hash map.

Figure 7:
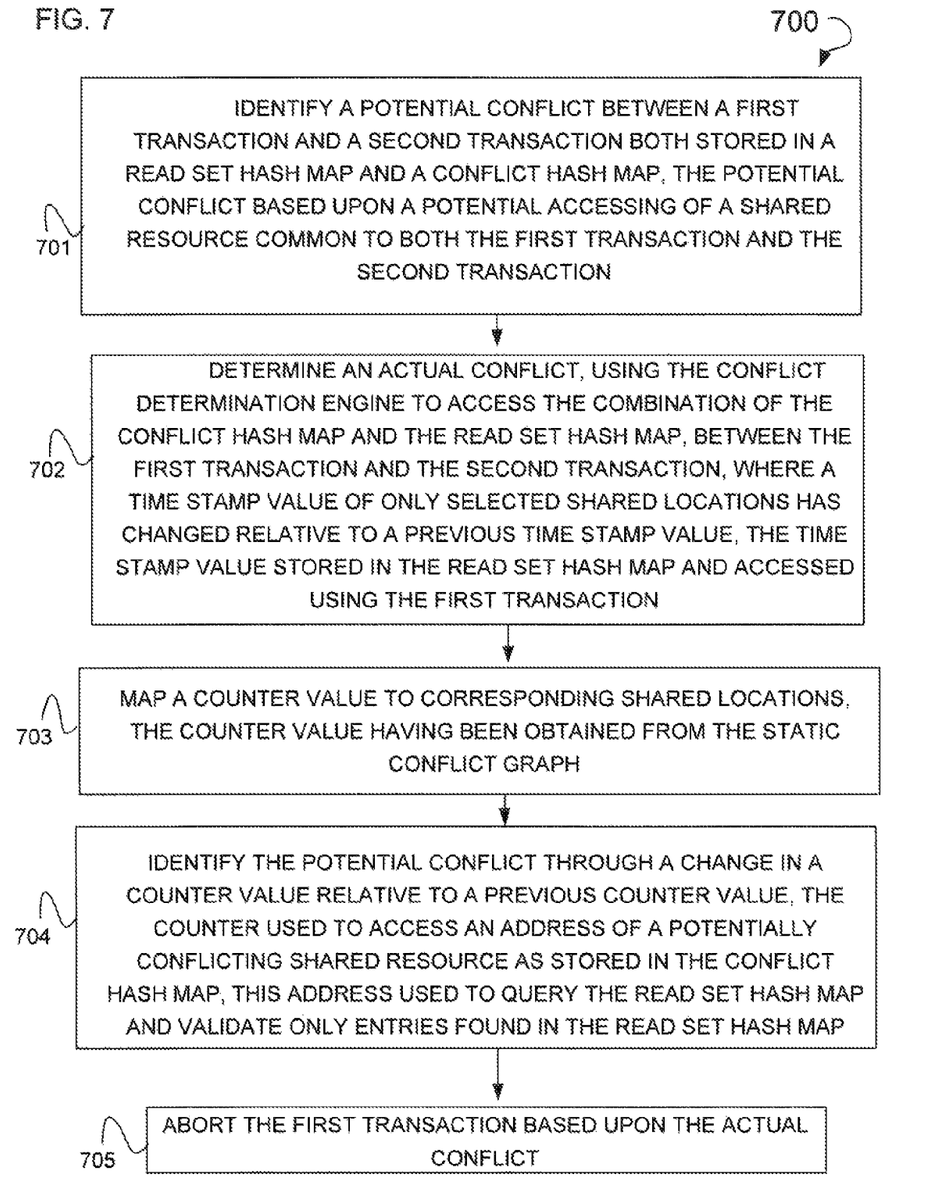
FIG. 7 is a flow chart illustrating a method, according to an example embodiment, executed to perform STM through the use of a static conflict analysis between atomic sections of software code.

FIG. 7 is a flow chart illustrating an example method 700 executed on a computer system 102 to perform STM through the use of a static conflict analysis between atomic sections of software code. Operation 701 is executed by the conflict determination engine 503 to identify a potential conflict between a first transaction and a second transaction both stored in a read set hash map and a conflict hash map, the potential conflict based upon a potential accessing of a shared resource common to both the first transaction and the second transaction. Operation 702 is also executed by the conflict determination engine 503 to determine an actual conflict between the first transaction and the second transaction, where a time stamp value of only selected shared locations has changed relative to a previous time stamp value, the time stamp value stored in the read set hash map and accessed using the first transaction. Operation 702 may also access both the conflict hash map and the read set hash map. In some example embodiments, the conflict hash map is instantiated at runtime from a static conflict graph, the static conflict graph including the first transaction and the second transaction as nodes in the static conflict graph, and the potential conflict as an edge in the static conflict graph. Operation 703 is executed by the mapping engine 504 to map a counter value to corresponding shared locations, the counter value having been obtained from the static conflict graph. In some example embodiments, the first and second transactions include at least one of a variable, a thread, or a function. In some example embodiments, the shared resource includes memory. Operation 704 is executed by the conflict determination engine 503 identify the potential conflict through a change in a counter value relative to a previous counter value, the counter used to access an address of a potentially conflicting shared resource as stored in the conflict hash map, this address used to query the read set hash map and validate only entries found in the read set hash map. Operation 705 is executed by the STM module 505 to abort the first transaction based upon the actual conflict.

Figure 8:
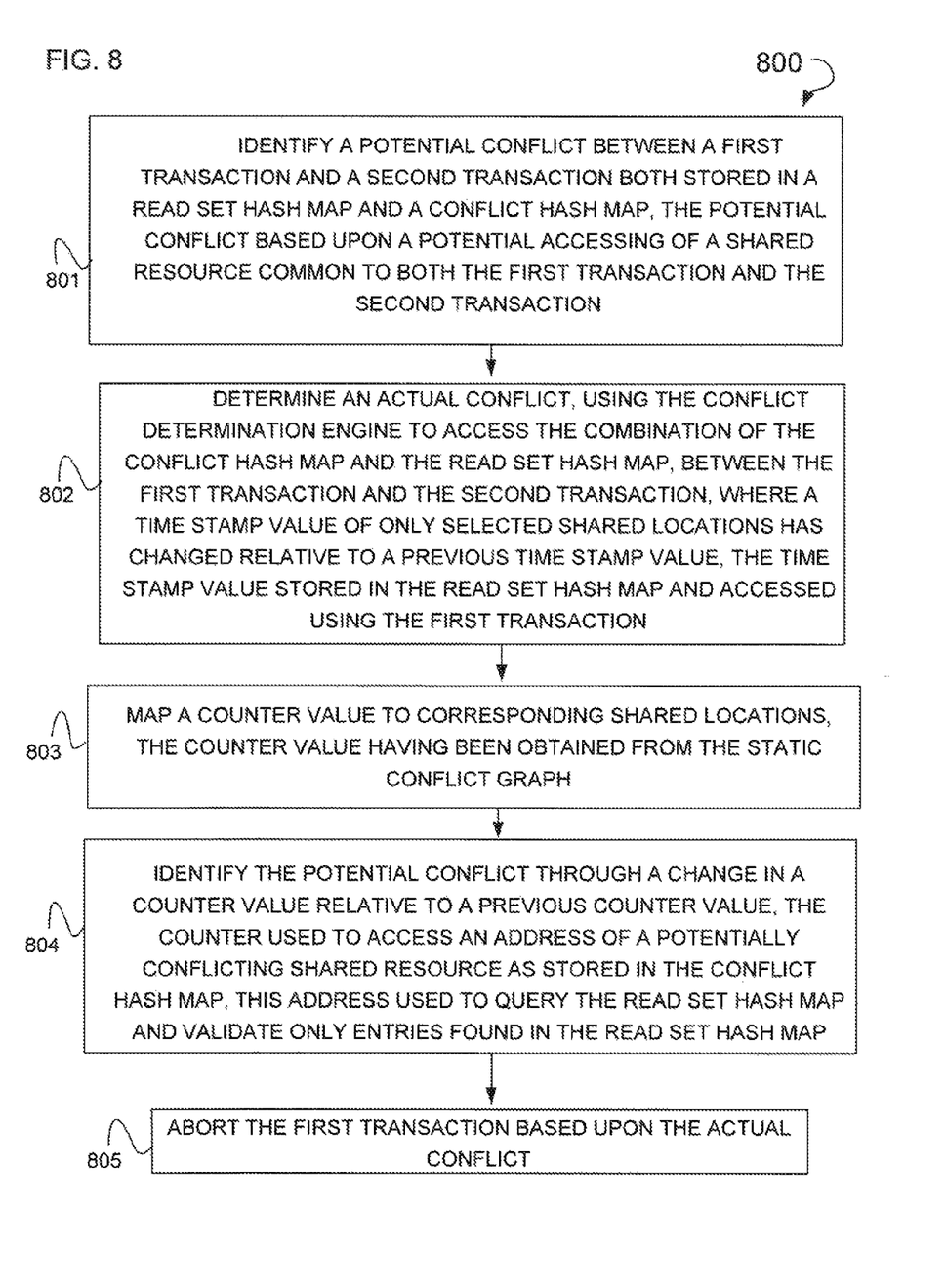
FIG. 8 is a flow chart illustrating a method, according to an example embodiment, executed to perform STM through the use of a static conflict analysis between atomic sections of software code.

FIG. 8 is a flow chart illustrating an example method 800 executed on a computer system 102 to perform STM through the use of a static conflict analysis between atomic sections of software code. Operation 801 is executed by the CPU 601 using logic encoded as part of the memory 602 in one or more tangible media for execution and when executed operable to identify a potential conflict between a first transaction and a second transaction both stored in a read set hash map and a conflict hash map, the potential conflict based upon a potential accessing of a shared resource common to both the first transaction and the second transaction. Operation 802 is executed by the CPU 601 using logic encoded as part of the memory 602 in one or more tangible media for execution and when executed operable to determine an actual conflict, through the access of the conflict hash map and the read set hash, between the first transaction and the second transaction, where a time stamp value of only selected shared locations has changed relative to a previous time stamp value, the time stamp value stored in the read set hash map and accessed using the first transaction. In some example embodiments, the conflict hash map is instantiated at runtime from a static conflict graph, the static conflict graph including the first transaction and the second transaction as nodes in the static conflict graph, and the potential conflict as an edge in the static conflict graph. Operation 803 is executed by the CPU 601 using logic encoded as part of the memory 602 in one or more tangible media for execution and when executed operable to map a counter value to corresponding shared locations, the counter value having been obtained from the static conflict graph. In some example embodiments, the first transaction and the second transaction include at least one of a variable, a thread, or a function. In some example embodiments, the system resource includes memory. Operation 804 is executed by the CPU 601 using logic encoded as part of the memory 602 in one or more tangible media for execution and when executed operable to identify the potential conflict through a change in a counter value relative to a previous counter value, the counter used to access an address of a potentially conflicting shared resource as stored in the conflict hash map, this address used to query the read set hash map and validate only entries found in the read set hash map.

Figure 9:
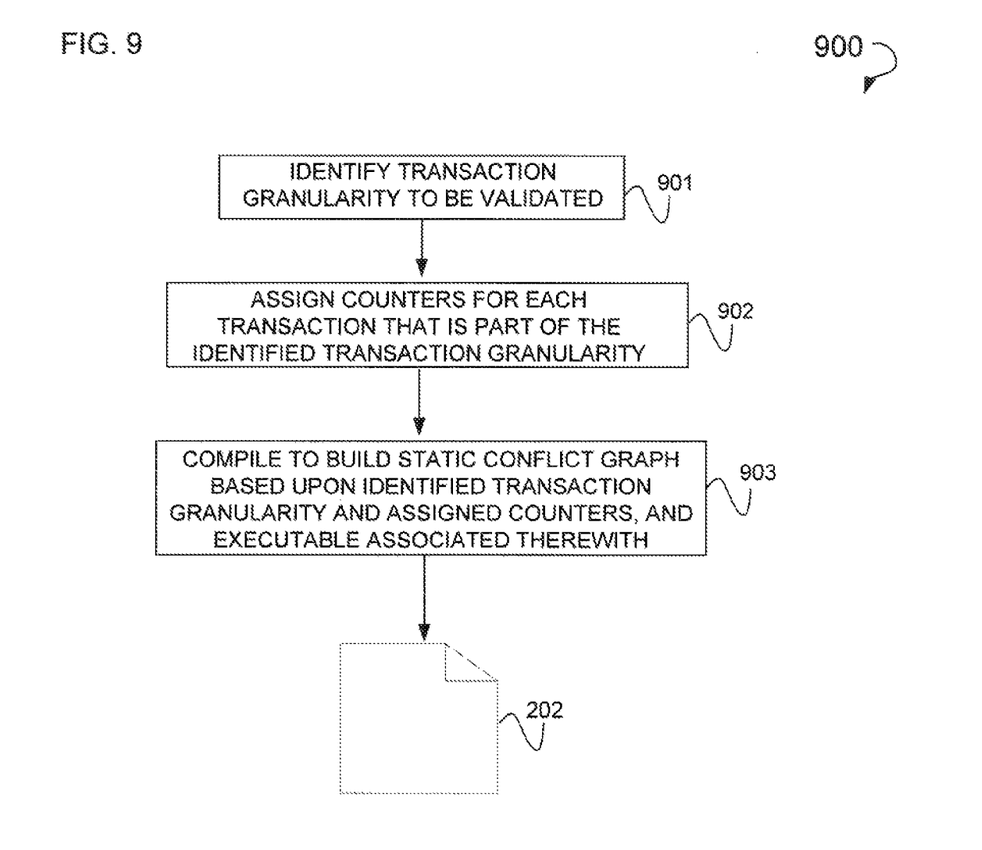
FIG. 9 is a flow chart illustrating a method, according to an example embodiment, that is executed during compile time to facilitate STM through the use of a static conflict analysis between atomic sections of software code.

FIG. 9 is a flow chart illustrating an example method 900 that is executed during compile time to facilitate STM through the use of a static conflict analysis between atomic sections of software code. This method 900 may be executed by the computer 102 as part of the IDE 105. Operation 901 is executed to identify a transaction granularity to be validated as part of an STM regime. Operation 902 is executed to assign a counter for each transaction that is part of the identified transaction granularity. The process of assignment includes mapping a counter to a software entity that is part of software code to be executed. Operation 903 is executed to compile the software code (i.e., the executable) to build a static conflict graph 202, based upon the identified transaction granularity and counters associated therewith.

Figure 10:
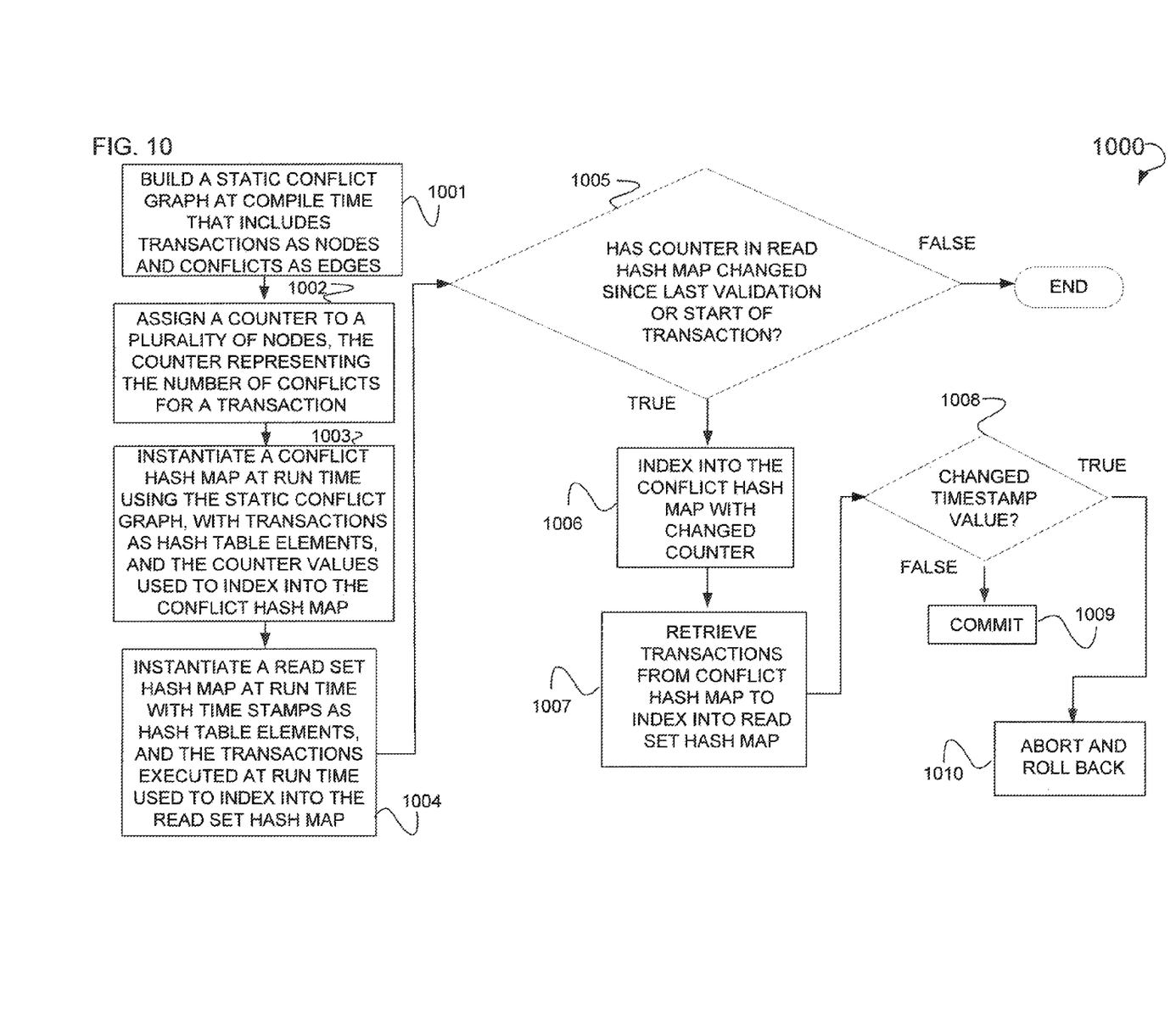
FIG. 10 is a flow chart illustrating a method, according to an example embodiment, that is executed during runtime to perform STM based concurrency control through the use of a static conflict analysis between atomic sections of software code.

FIG. 10 is a flow chart illustrating an example method 1000 that is executed during runtime to perform STM based concurrency control through the use of a static conflict analysis between atomic sections of software code. This method 1000 may be executed by the computer system 102 and IDE 105 associated therewith, or by another computer system implementing an STM based concurrency control regime. Operation 1001 is executed to build a static conflict graph at compile time. The static conflict graph to include transactions as nodes and conflicts as edges. Operation 1002 is executed to assign a counter to one or more nodes (e.g., a plurality), the counter representing the conflicts for a transaction. In some example embodiments, the graph will also include other data in the form of annotations. Operation 1003 is executed to instantiate a conflict hash map at run time using the static conflict graph. The conflicting shared locations of the static conflict graph serve as hash table elements, and the counter address(es) are used to index into the conflict hash map. Operation 1004 is executed to instantiate a read set hash map at run time. The read set hash map has timestamps that serve as elements in the read set hash map. These elements are updated when the corresponding shared locations are read within the transaction. Further, the read set hash map is indexed into using the address of the shared location for which a time stamp value is sought. Decision operation 1005 is executed to determine whether the counter value in the conflict hash map has changed since a previous STM validation or the start of a transaction. In cases where decision operation 1005 evaluated to "false," a termination condition is executed. In cases where decision operation 1005 evaluates to "true," an operation 1006 is executed. Operation 1006 is executed to index into the conflict hash map using the address of the recently changed counter. Operation 1007 is executed to retrieve shared locations from the conflict hash map to be used to query the read set hash map. Decision operation 1008 is executed to determine whether a change to the timestamp value has occurred. In cases where decision operation 1008 evaluates to "false," an operation 1009 is executed and an STM commit is determined. In cases where decision operation 1008 evaluated to "true," an operation 1010 is executed and an STM abort and rollback is determined and executed.

Figure 11:
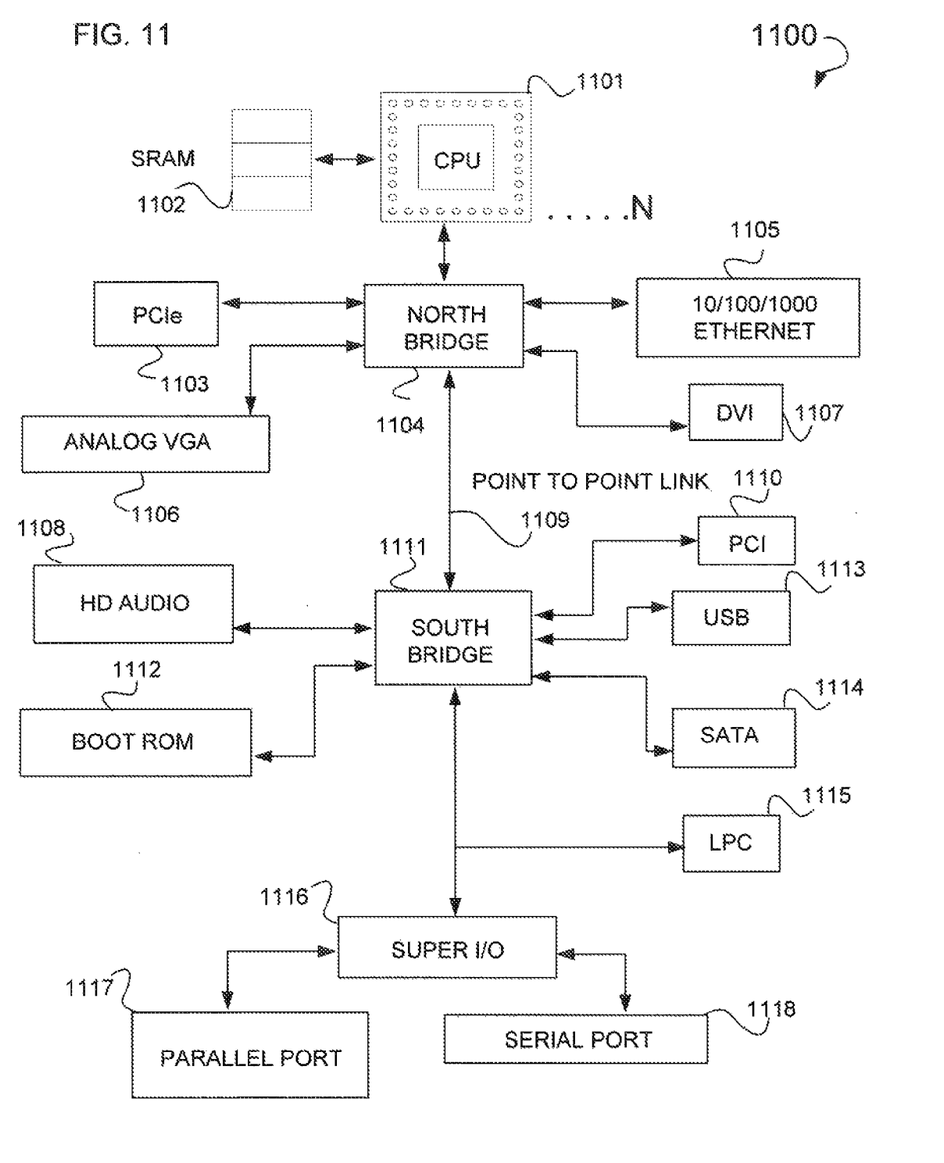
FIG. 11 is a diagram of an example computer system.

FIG. 11 is a diagram of an example computer system 1100. Shown is a CPU 1101. The processor die 201 may be a CPU 1101. In some example embodiments, a plurality of CPU may be implemented on the computer system 1100 in the form of a plurality of core (e.g., a multi-core computer system), or in some other suitable configuration. Some example CPUs include the x86 series CPU. Operatively connected to the CPU 1101 is Static Random Access Memory (SRAM) 1102. Operatively connected includes a physical or logical connection such as, for example, a point to point connection, an optical connection, a bus connection or some other suitable connection. A North Bridge 1104 is shown, also known as a Memory Controller Hub (MCH), or an Integrated Memory Controller (IMC), that handles communication between the CPU and PCIe, Dynamic Random Access Memory (DRAM), and the South Bridge. An ethernet port 1105 is shown that is operatively connected to the North Bridge 1104. A Digital Visual Interface (DVI) port 1107 is shown that is operatively connected to the North Bridge 1104. Additionally, an analog Video Graphics Array (VGA) port 1106 is shown that is operatively connected to the North Bridge 1104. Connecting the North Bridge 1104 and the South Bridge 1111 is a point to point link 1109. In some example embodiments, the point to point link 1109 is replaced with one of the above referenced physical or logical connections. A South Bridge 1111, also known as an I/O Controller Hub (ICH) or a Platform Controller Flub (PCH), is also illustrated. A PCIe port 1103 is shown that provides a computer expansion port for connection to graphics cards and associated GPUs. Operatively connected to the South Bridge 1111 are a High Definition (HD) audio port 1108, boot RAM port 1112, PCI port 1110, Universal Serial Bus (USB) port 1113, a port for a Serial Advanced Technology Attachment (SATA) 1114, and a port for a Low Pin Count (LPC) bus 1115. Operatively connected to the South Bridge 1111 is a Super Input/Output (I/O) controller 1116 to provide an interface for low-bandwidth devices (e.g., keyboard, mouse, serial ports, parallel ports, disk controllers). Operatively connected to the Super I/O controller 1116 is a parallel port 1117, and a serial port 1118.

The SATA port 1114 may interface with a persistent storage medium (e.g., an optical storage devices, or magnetic storage device) that includes a machine-readable medium on which is stored one or more sets of instructions and data structures (e.g., software) embodying or utilized by any one or more of the methodologies or functions illustrated herein. The software may also reside, completely or at least partially, within the SRAM 1102 and/or within the CPU 1101 during execution thereof by the computer system 1100. The instructions may further be transmitted or received over the 10/100/1000 ethernet port 1105, USB port 1113 or some other suitable port illustrated herein.

In some example embodiments, a removable physical storage medium is shown to be a single computer-readable medium or media, and the term "computer-readable media" should be taken to include a single media or multiple media (e.g., a centralized or distributed database, and/or associated caches and servers) that store the one or more sets of instructions. The term "computer-readable media" shall also be taken to include any media that is capable of storing, encoding or carrying a set of instructions for execution by the machine and that cause the machine to perform any of the one or more of the methodologies illustrated herein. The term "computer-readable media" shall accordingly be taken to include, but not be limited to, solid-state memories, optical and magnetic media, and carrier wave signals.

In some example embodiments, the methods illustrated herein are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the "true" spirit and scope of the invention.

What is claimed is:

1. A computer implemented method comprising:
identifying a potential conflict, using a conflict determination engine, between a first transaction and a second transaction both stored in a read set hash map and a conflict hash map, the potential conflict based upon a potential accessing of a shared resource common to both the first transaction and the second transaction; and
determining an actual conflict, using the conflict determination engine to access the combination of the conflict hash map and the read set hash map, between the first transaction and the second transaction, where a time stamp value of only selected shared locations has changed relative to a previous time stamp value, the time stamp value stored in the read set hash map and accessed using the first transaction.

2. The computer implemented method of claim 1, wherein the conflict hash map is instantiated at runtime from a static conflict graph, the static conflict graph including the first transaction and the second transaction as nodes in the static conflict graph, and the potential conflict as an edge in the static conflict graph.

3. The computer implemented method of claim 2, further comprising mapping, using a mapping engine, a counter value to corresponding shared locations, the counter value having been obtained from the static conflict graph.

4. The computer implemented method of claim 1, wherein the first and second transactions include at least one of a variable, a thread, or a function.

5. The computer implemented method of claim 1, wherein the shared resource includes memory.

6. The computer implemented method of claim 1, further comprising identifying the potential conflict, using the conflict determination engine, through a change in a counter value relative to a previous counter value, the counter used to access an address of a potentially conflicting shared resource as stored in the conflict hash map, this address used to query the read set hash map and validate only entries found in the read set hash map.

7. The computer implemented method of claim 1, further comprising aborting, using a Software Transactional Memory (STM) module, the first transaction based upon the actual conflict.

8. A computer system comprising:
a conflict determination engine to identify a potential conflict between a first transaction and a second transaction both stored in a read set hash map and a conflict hash map, the potential conflict based upon a potential accessing of a shared resource common to both the first transaction and the second transaction; and
the conflict determination engine to access the conflict hash map and the read set hash map determine an actual conflict between the first transaction and the second transaction, where a time stamp value of only selected shared locations has changed relative to a previous time stamp value, the time stamp value stored in the read set hash map and accessed using the first transaction.

9. The computer system of claim 8, wherein the conflict hash map is instantiated at runtime from a static conflict graph, the static conflict graph including the first transaction and the second transaction as nodes in the static conflict graph, and the potential conflict as an edge in the static conflict graph.

10. The computer system of claim 8, further comprising a mapping engine to map a counter value to corresponding shared locations, the counter value having been obtained from the static conflict graph.

11. The computer system of claim 8, wherein the first transaction and the second transaction include at least one of a variable, a thread, or a function.

12. The computer system of claim 8, wherein the system resource includes memory.

13. The computer system of claim 8, wherein the conflict determination engine is used to identify the potential conflict through a change in a counter value relative to a previous counter value, the counter used to access an address of a potentially conflicting shared resource as stored in the conflict hash map, this address used to query the read set hash map and validate only entries found in the read set hash map.

14. The computer system of claim 8, further comprising a Software Transactional Memory (STM) module to abort the first transaction based upon the actual conflict.

15. A computer system comprising:
at least one processor;
a memory in communication with the at least one processor, the memory including logic encoded in one or more tangible media for execution and when executed operable to:

identify a potential conflict between a first transaction and a second transaction both stored in a read set hash map and a conflict hash map, the potential conflict based upon a potential accessing of a shared resource common to both the first transaction and the second transaction; and determine an actual conflict, through the access of the conflict hash map and the read set hash, between the first transaction and the second transaction, where a time stamp value of only selected shared locations has changed relative to a previous time stamp value, the time stamp value stored in the read set hash map and accessed using the first transaction.

16. The computer system of claim 15, wherein the conflict hash map is instantiated at runtime from a static conflict graph, the static conflict graph including the first transaction and the second transaction as nodes in the static conflict graph, and the potential conflict as an edge in the static conflict graph.

17. The computer system of claim 16, further comprising the memory in communication with the at least one processor, the memory including logic encoded in one or more tangible media for execution and when executed operable to map a counter value to corresponding shared locations, the counter value having been obtained from the static conflict graph.

18. The computer system of claim 15, wherein the first transaction and the second transaction include at least one of a variable, a thread, or a function.

19. The computer system of claim 15, wherein the system resource includes memory.

20. The computer system of claim 15, further comprising the memory in communication with the at least one processor, the memory including logic encoded in one or more tangible media for execution and when executed operable to identify the potential conflict through a change in a counter value relative to a previous counter value, the counter used to access an address of a potentially conflicting shared resource as stored in the conflict hash map, this address used to query the read set hash map and validate only entries found in the read set hash map.

* * * * *